United States Patent [19]
Vircks et al.

[11] 3,918,662
[45] Nov. 11, 1975

[54] LOCALIZER LATERAL GUIDANCE CONTROL SYSTEM

[75] Inventors: Robert M. Vircks; Henry F. Tisdale, both of Kent, Wash.

[73] Assignee: The Boeing Company, Seattle, Wash.

[22] Filed: Jan. 21, 1974

[21] Appl. No.: 434,879

[52] U.S. Cl. ......... 244/77 A; 235/150.22; 318/583; 343/107
[51] Int. Cl.² ....................................... B64C 13/18
[58] Field of Search ............. 73/178 T; 235/150.22 150.26; 244/77 A, 77 B, 77 E; 318/583 585; 340/27 NA; 343/5 LS, 107, 108 R

[56] References Cited
UNITED STATES PATENTS

| | | | |
|---|---|---|---|
| 3,040,316 | 6/1962 | Sather | 244/77 A X |
| 3,172,624 | 3/1965 | Parker et al. | 244/77 A |
| 3,223,362 | 12/1965 | Doniger | 244/77 A |
| 3,345,017 | 10/1967 | Olah | 244/77 A |
| 3,387,302 | 6/1968 | Bevan | 244/77 A X |
| 3,467,344 | 9/1969 | Kramer et al. | 244/77 A |
| 3,505,676 | 4/1970 | Perkins | 343/107 |
| 3,812,333 | 5/1974 | Mineck et al. | 244/77 A X |

*Primary Examiner*—Trygve M. Blix
*Assistant Examiner*—Stephen G. Kunin
*Attorney, Agent, or Firm*—Christensen, O'Connor, Garrison & Havelka

[57] ABSTRACT

In a localizer lateral guidance control system suitable for use in an aircraft automatic landing system, aircraft originated signals of a complementary nature, plus the localizer beam error signal (including distortions, if they exist), are applied to a low-pass beam filter. The complementary aircraft originated signals allow the low-pass beam filter to have a relatively low breakpoint, without loss of system stability. That is, while the low-pass beam filter eliminates unwanted distortions, because of the added aircraft information, the output of the low-pass beam filter includes all of the information necessary to control the lateral position of the aircraft with respect to the approximate mean of the ILS radio beam without loss of stability.

2 Claims, 4 Drawing Figures

LOCALIZER LATERAL GUIDANCE CONTROL SYSTEM

BACKGROUND OF THE INVENTION

This invention is directed to aircraft automatic pilot systems and more particularly to aircraft automatic landing systems.

Systems for automatically flying an aircraft between two points without manual pilot control have come into widespread use. In recent years, attempts have been made to develop systems for automatically landing an aircraft without manual assistance from the pilot. While such systems have been somewhat successful, they have not been entirely satisfactory for a variety of reasons. One of the major reasons that prior art automatic landing systems have not been entirely satisfactory is that distortions in the localizer signal, in some cases, have caused an aircraft tracking the signal to respond in a manner which is disturbing to the crew and passengers. In some cases such responses have even precluded safe landings.

Distortions in the localizer signal can be caused by a variety of circumstances. They can be caused by transients occurring as the result of localizer transmitter failures. They can be caused by "ghost" reflections from overflying aircraft. In addition, they can be caused by aircraft moving on the ground, and by reflections from surrounding buildings. While some distortions could be eliminated by replacing existing transmitter equipment at local airports, such a solution has been found to be awkward because of the many public and private interests involved, and because of the additional expense required. Thus, it is desirable to improve aircraft automatic landing systems. This invention is directed to improving the lateral aspects of automatic aircraft landing systems so that the aircraft using the system will avoid going through maneuvers which preclude safe landing and/or which may be unsettling to the crew and passengers.

Therefore, it is an object of this invention to provide a new and improved localizer lateral guidance control system for use in aircraft automatic landing systems.

It is a further object of this invention to provide a new and improved lateral guidance control system for use in the aircraft automatic pilot systems that eliminates radio beam distortions.

It is yet another object of this invention to provide an automatic landing system which rejects lateral distortions in the localizer beam that could cause unsafe and/or disturbing aircraft landing maneuvers.

SUMMARY OF THE INVENTION

In accordance with the principles of this invention, a lateral guidance control system suitable for use in automatic landing systems is provided. The instrument landing system (ILS) localizer beam error signal is used to create a lateral displacement signal that may include distortions. The lateral displacement signal is summed with an aircraft instrument signal of a complementary nature. The result of the summation is passed through a low breakpoint, low-pass beam filter. The output of the filter is a signal that includes all of the lateral displacement information necessary to control the lateral control surfaces (ailerons) of the aircraft and, hence, maintain satisfactory control of lateral aircraft position.

In accordance with other principles of this invention, the complementary aircraft instrument signal is a track angle error signal generated by a combination of inertial sensors and a course deviation instrument. One means for generating the track angle error signal, for example, is the inertial navigation system (INS). Other means may also be utilized, as desired. The track angle error signal is modified to create a lateral velocity signal. Alternately, a lateral velocity signal may be obtained by other techniques. In any event, in addition, the localizer beam error signal is multiplied by a signal related to the altitude of the aircraft to obtain a signal proportional to lateral displacement in cartesian, rather than polar, coordinates. These two signals, lateral velocity and lateral displacement, are summed and filtered by the low breakpoint, low-pass beam filter to create an estimated lateral deviation signal that is used to control the ailerons of the aircraft.

In accordance with still other principles of this invention, the low breakpoint, low-pass beam filter comprises a first order lag filter which may be formed of a single feedback circuit and an integrator. The lateral velocity signal is introduced into the filter by summing it with the lateral displacement signal or by connecting the lateral velocity signal directly to the input of the integrator. The former mechanization requires that the lateral velocity signal be multiplied by the filter time constant whereas the latter mechanization does not require modification of the lateral velocity signal.

In accordance with further principles of this invention, the output from the integrator is further summed with a stabilization signal which prevents oscillation and loss of the localizer beam, and a lock-on signal. The signal resulting from this summation is limited and then summed with a roll attitude feedback signal. The signal resulting from this summation has a gain applied to it and is summed with a roll rate feedback signal. The roll angle and roll rate feedback signals provide inner loop stabilization.

In accordance with yet other principles of this invention, a capture system is provided which captures the localizer beam error signal prior to switching the invention into an approach on course (APP O/C) mode of operation.

It will be appreciated from the foregoing brief summary that the invention provides an improved lateral guidance control system suitable for use in aircraft automatic landing systems to prevent rapid lateral changes in aircraft attitude, which changes could be disturbing and even dangerous to the passengers and crew during the landing of the aircraft. In essence, the invention prevents rapid lateral changes by adding complementary aircraft instrumentation generated signals to the ILS localizer beam error signal and then filtering the resultant signal to eliminate high and medium frequency distortions. All of these actions take place without loss of aircraft stability because the resultant lateral deviation signal includes all of the information necessary to control the ailerons of the aircraft.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein.

DESCRIPTION OF THE PREFERRED EMBODIMENT

Figure 1:
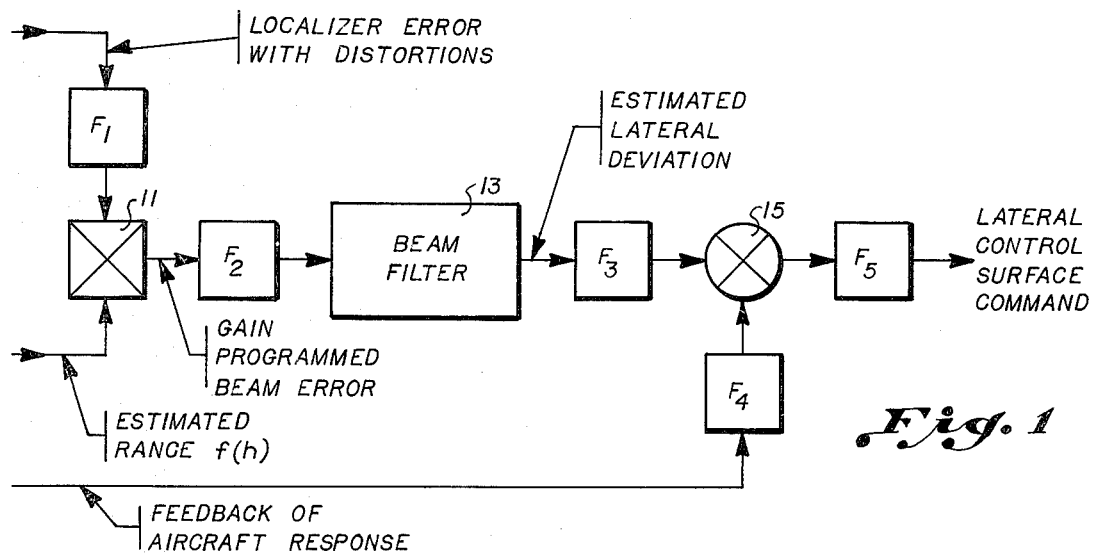
FIG. 1 is a block diagram of a prior art lateral guidance control system.

FIG. 1 is a block diagram of a prior art lateral guidance control system used in an automatic landing system and comprises a multiplier 11; a beam filter 13; a two-input summer 15; and, five function circuits designated $F_1$, $F_2$, $F_3$, $F_4$ and $F_5$. The function circuits, as is well known to those skilled in the aircraft control art, are included in aircraft control systems in order to raise system signals to appropriate levels. Thus, $F_1$, $F_2$, $F_3$, $F_4$ and $F_5$ are gain circuits that perform autopilot transfer functions which, while not specifically defined herein, are well known to those skilled in the aircraft control art. Thus, these functions may be common between lateral autopilots with and without this invention.

The instrument landing system (ILS) localizer beam error signal, which includes distortion errors, is applied through $F_1$ to one input of the multiplier 11. An altitude function signal, designated $f(h)$, generated by aircraft instruments and related to the estimated range between the aircraft and the airport it is approaching is applied to the second input of the multiplier 11. Thus, the output of the multiplier 11 is a combination of the localizer beam error signal, with distortions, and an altitude signal. This output is designated a gain programmed beam error signal.

The gain programmed beam error signal is applied through $F_2$ to the beam filter 13. The beam filter 13 eliminates some high frequency distortions and, preferably, is a first order lag filter. While the beam filter 13 eliminates some high frequency distortions, it has certain disadvantages. More specifically, the beam filter, in order to maintain system stability, must have a relatively high breakpoint, i.e., a short time constant. The short time constant requirement, on the other hand, allows some high frequency errors to creep into the system. These errors, should they occur, can cause the aircraft to make rapid lateral changes. At a minimum, such changes may be unsettling to the crew and passengers. At a maximum, rapid lateral changes can create unsafe landing situations.

The output of the beam filter 13 is an estimated lateral deviation signal (i.e., an estimate of the lateral deviation of the aircraft from its desired position along the localizer beam) and is applied through $F_3$ to one input of the summer 15. A signal designated feedback of aircraft response is applied through $F_4$ to the second input of the summer 15. The feedback of aircraft response signal may be one or more signals related to the roll response of the aircraft to a lateral control surface (aileron) command, such as roll rate and roll angle signals, for examples.

The output of the summer 15 is applied to the input of $F_5$. The output from $F_5$ is a lateral control surface command signal. This signal, through suitable coupling means well known to those skilled in the art, controls the ailerons of the aircraft which in turn control the lateral position of the aircraft.

As previously indicated, the major disadvantage of prior art systems of the type illustrated in FIG. 1 is that the beam filter, in order to maintain system stability, must have a short time constant. This short time constant means that the circuit must generally be a simple first order lag circuit having a relatively high breakpoint. Such a circuit does not filter to the degree necessary to eliminate signals that could cause unsettling aircraft maneuvers and, in some cases, could cause unsafe landing situations. This invention is directed to overcoming this disadvantage.

Figure 2:
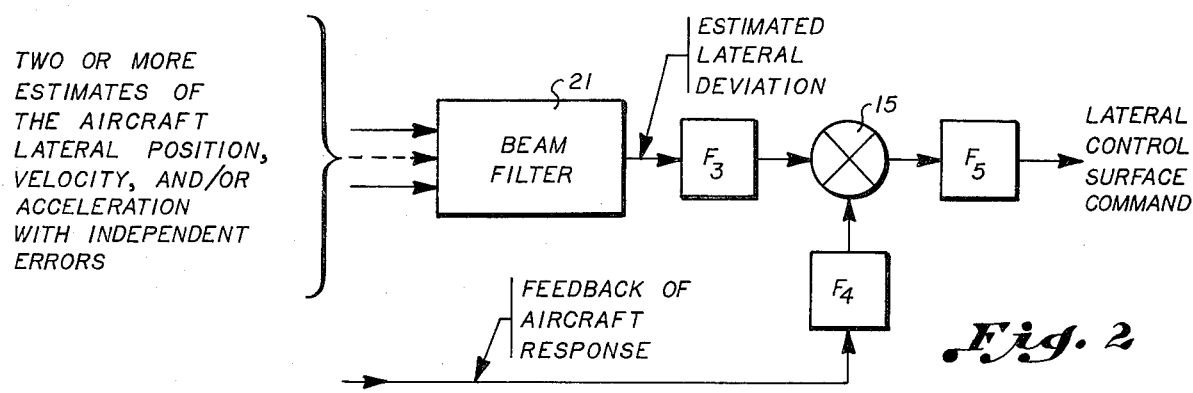
FIG. 2 is a block diagram generally illustrating the invention.

FIG. 2 is a block diagram generally illustrating the invention and comprises: a beam filter 21, the two-input summer 15 and the function circuits designated $F_3$, $F_4$ and $F_5$. In other words, the system illustrated in FIG. 2 comprises the "rear end" of the system illustrated in FIG. 1. The primary difference between the two systems is that the beam filter 21, rather than only receiving the gain programmed beam error signal, receives two or more estimates of the lateral position, velocity and/or acceleration of the aircraft with independent errors. Thus, the beam filter receives the localized error with distortion signal (combined with an estimated range signal) and at least one other signal (preferably, aircraft generated). The other signal also includes lateral information about the aircraft, such as the lateral position, velocity and/or acceleration of the aircraft. More specifically, the beam filter 21 receives complementary information from one or more additional sources. The complementary information complements the information obtained from the localizer signal and allows the breakpoint of the beam filter to be considerably lower whereby distortions can be eliminated without an associated decrease in aircraft stability.

As with FIG. 1, the output from the beam filter 21 is an estimated lateral deviation signal and is applied through $F_3$ to one input of the summer 15. A feedback of aircraft response signal is applied through $F_4$ to a second input to the summer 15. The output of the summer 15 is applied to the input of $F_5$ and the output of $F_5$ is a lateral control surface command signal.

Figure 3:
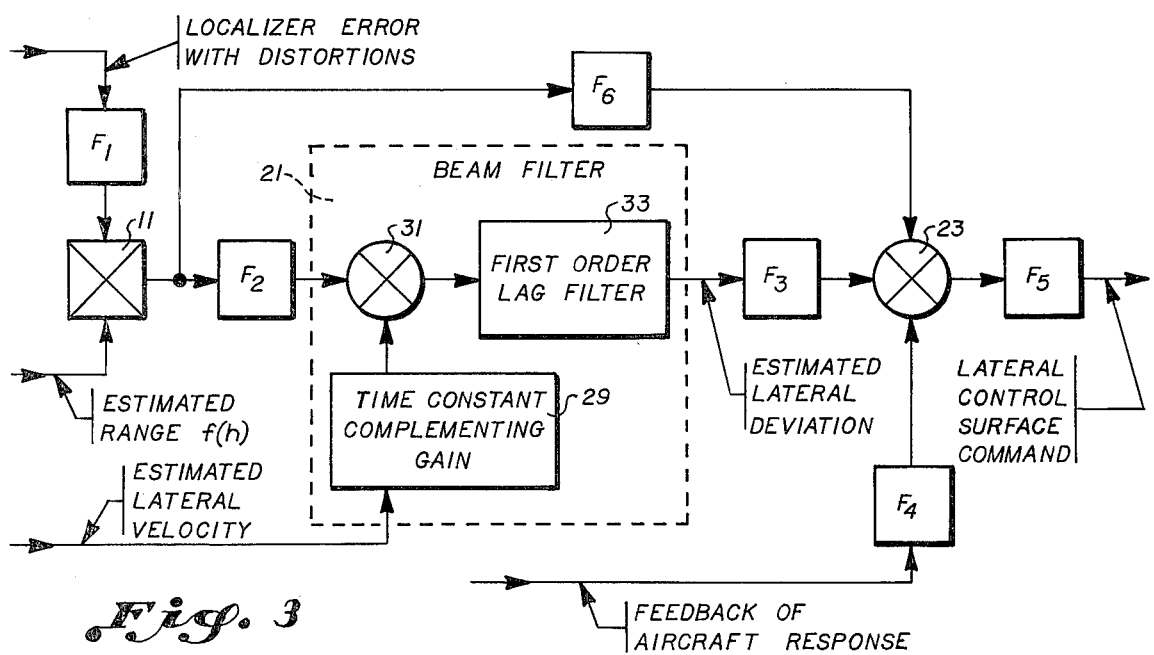
FIG. 3 is a somewhat more detailed block diagram also generally illustrating the invention; and, FIG. 4 is a block diagram illustrating in still more detail a preferred embodiment of the invention.

FIG. 3 is a block diagram illustrating a first implementation of the invention in slightly more detail and comprises the five function circuits designated $F_1$–$F_5$; an additional function circuit designated $F_6$; the beam filter 21 which receives two or more estimates of the aircraft lateral position, velocity and/or acceleration with independent errors; the multiplier 11; and, a three-input summer 23, the two-input summer 15 being eliminated.

As with the prior art system illustrated in FIG. 1, the localizer error with distortions signal is applied through $F_1$ to one input of the multiplier 11. An estimated range signal, $f(h)$, is applied to the second input of the multiplier 11. The output of the multiplier 11 is applied through $F_2$ to one input of the beam filter 21. The output of the multiplier 11 is also applied through $F_6$, which, preferably, is an integrating gain circuit, to an input of the summer 23. The output of $F_6$ is a lock-on signal that locks the lateral guidance control system of the invention to the localizer beam signal and removes steady state errors, as will be better understood from the following description.

The beam filter 21 comprises a complementing gain circuit 29, a two-input summer 31 and a first order lag circuit 33. An estimated lateral velocity signal generated by the aircraft's instruments is applied through the complementing gain circuit 29 to one input of the beam filter summer 31. The gain of the complementing gain circuit is proportional to the time constant of the first order lag filter 33 and incorporates any gain necessary to match scale factors.

The output of $F_2$ is applied to the second input of the beam filter summer 31. Thus, the beam filter summer 31 receives two signals, one related to lateral displacement and the other related to lateral velocity. The lateral velocity signal complements the lateral displacement information contained in the beam error signal but does not complement any distortions contained in that signal because it is generated by aircraft sensors, i.e., by and airborne stabilized inertial platform, for example. In any event, these two signals are summed by the beam filter summer 31 and applied to the input of the first order lag filter 33. The mathematical equation defining the first order lag filter is:

$$\frac{1}{\tau s + 1}$$

where: $\tau$ is first order lag time constant and is proportional to the value of the gain in the complementing gain circuit 29 and s is the Laplace operator.

Because complementary information has been added to the gain programmed beam error signal (the input signal applied to $F_2$), the first order lag filter 33 is allowed to have a breakpoint much lower than it is allowed to have without the addition of the complementary information. The output of the first order lag filter is an estimated lateral deviation signal that moves over the full frequency range. Hence, aircraft stability is not lost. In other words, the first order lag filter (low-pass) removes high frequency information from the portion of the signal caused by localizer beam errors. The lost information is replaced from the complementary signal whereby full frequency range response is achieved. This feat (elimination of high frequency distortions caused by localizer beam errors) cannot be accomplished by prior art estimated lateral deviation apparatus because loss of system stability occurs.

The output of the first order lag filter 33 is applied to the input of $F_3$. The output of $F_3$ is applied to an input of the three-input summer 23. The feedback of aircraft response signal is applied through $F_4$ to the third input of the three-input summer 23. The output of the three-input summer 23 is applied to the input of $F_5$, and the output of $F_5$ is a lateral control surface command signal. The lateral control surface command signal is utilized to control the ailerons of the aircraft and, thus, controls the lateral position of the aircraft.

In summary, it will be appreciated from the foregoing description and viewing FIG. 3 that the beam filter 21, in essence, is a complementary filter that receives a complementary information signal generated by aircraft sensors. This signal is designated an estimated lateral velocity signal and allows the beam filter to have a much lower time constant than it could have without this signal. The lower time constant lowers the breakpoint of the beam filter resulting in the first order lag filter eliminating high frequency distortion errors and the disadvantages caused by such errors, i.e., rapid lateral movement of the aircraft and control surfaces, without loss of aircraft stability.

Mathematically, the output of the first order lag filter 33 is the same as the output of $F_2$, if the estimated lateral velocity is indeed the derivative of the lateral deviation information contained in a distortionless localizer error signal, i.e., if the localizer error signal is complementary without distortion.

More specifically, if the estimated lateral velocity is designated $\dot{Y}$ and the output of $F_2$ is designated $Y$, then the output of the two-input summer 31 is:
$$\dot{y}\tau + y$$
and, the output of the first order lag filter is:

$$(\dot{y}\tau + y)\left(\frac{1}{\tau s + 1}\right) = \frac{y\tau + y}{\tau s + 1}$$

since $\dot{y} = ys$, the foregoing equation can be changed to:

$$\frac{y\tau s + y}{\tau s + 1} = y \quad \left(\frac{\tau s + 1}{\tau s + 1}\right) = y$$

Thus proving that the output of the filter is a lateral deviation signal which is identical to the output of $F_2$ when the localizer error signal provides an ideal estimate of the lateral position of the aircraft.

Figure 4:
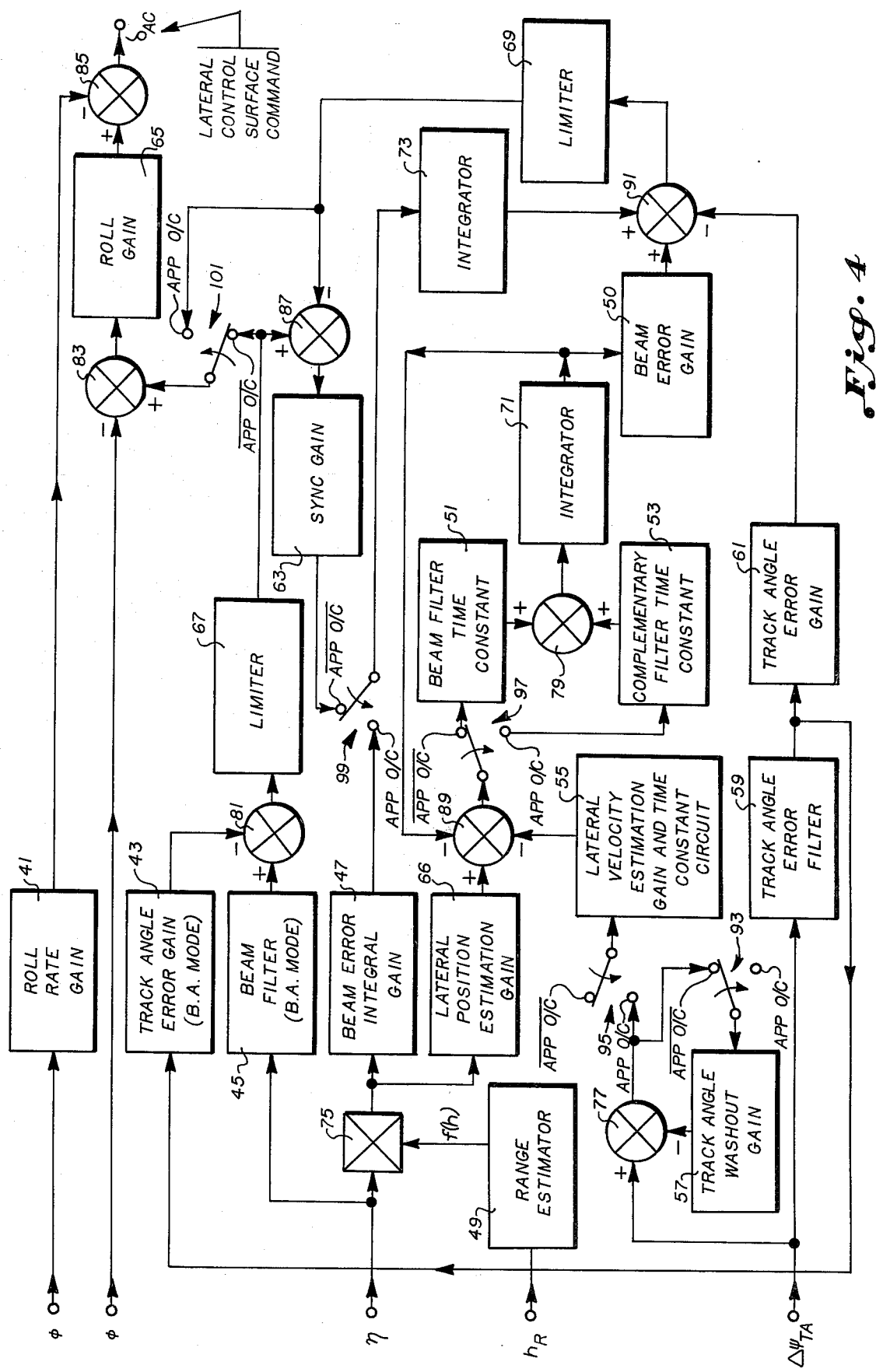

FIG. 4 is a block diagram illustrating the preferred embodiment of the invention in still more detail. The embodiment of the invention illustrated in FIG. 4 comprises: a roll rate gain circuit 41; a track error gain circuit (beam acquisition mode) 43; beam filter (beam acquisition mode) 45; a beam error integral gain circuit 47; a range estimator 49; a beam error gain circuit 50; a beam filter time constant circuit 51; a complementary filter time constant circuit 53; a lateral velocity estimation and time constant circuit 55; a track angle washout gain circuit 57; a track angle error filter 59; a track angle error gain circuit 61; a sync gain circuit 63; a roll gain circuit 65; a lateral position estimation gain circuit 66; first and second limiters 67 and 69; first and second integrators 71 and 73; a multiplier 75; six two-input summers 77, 79, 81, 83, 85 and 87; and, two three-input summers 89 and 91. In addition, five single-pole, double-throw switches 93, 95, 97, 99 and 101 are illustrated in FIG. 4.

All of the single-pole, double-throw switches have a common terminal and two remote terminals. One remote terminal is designated APP O/C and the other is designated $\overline{\text{APP O/C}}$. APP O/C designates approach on course and $\overline{\text{APP O/C}}$ designates the converse or "not" approach on course. When the invention, as will be better understood from the following description, is in a beam acquisition mode, all of the switches are in their $\overline{\text{APP O/C}}$ positions. When the localizer beam has been adequately acquired, the "approach on course" mode is engaged, and all of the switches, preferably concurrently, are switched to their APP O/C positions.

A roll rate signal designated $\dot{\phi}$ and generated by a rate gyro or other sensor of the aircraft is applied to the input of the roll rate gain circuit 41. The roll rate gain circuit has a gain designated $K_{\dot{\phi}}$. The output of the roll rate gain circuit 41 is applied to one input of the fifth two-input summer 85. An aircraft roll angle signal designated $\phi$ and generated by the inertial navigation system vertical gyroscope or other sensor) of the aircraft is applied to one input of the fourth two-input summer 83.

A signal designated $\eta$ is applied to one input of the multiplier 75 and through the beam filter 45 to one input of the third two-input summer 81. $\eta$ is the ILS localizer beam error signal and is obtained from the ILS receiver. A radio altitude signal designated $h_R$ and generated by the radio altimeter of the aircraft is applied through the range estimator 49 to the second input of the multiplier 75. The output of the range estimator 49 is the estimated range or altitude function signal $f(h)$ previously described.

The output of the multiplier 75 is applied to the input of the beam error integral gain circuit 47 and to the input of the lateral position estimation gain circuit 66. The beam error integral gain circuit 47 has a gain designated $K_I$. The output of the lateral position estimator gain circuit 66 is applied to one input of the first three-input summer 89.

A track angle error signal generated by the course deviation instrumentation of the aircraft and designated $\Delta\psi_{TA}$ is applied to the input of the track angle error filter 59 and to one input of the first two-input summer 77. The track angle error filter is a first order lag filter defined by the mathematical equation:

$$\frac{1}{\tau_{\psi_{TA}} s+1}$$

where: $\tau_{\psi_{TA}}$ is the track angle time constant and $s$ is the Laplace operator. The output of the track angle error filter 59 is applied through the track angle error gain (beam acquisition mode) circuit 43 to the second input of the third two-input summer 81. The track angle error gain (beam acquisition mode) circuit 43 has a gain designated $K_{\psi_{TA\,BA}}$.

The output of the third two-input summer 81 is applied through the first limiter 67 to one input of the sixth two-input summer 87 and to the $\overline{\text{APP O/C}}$ terminal of the fifth switch 101. The common terminal of the fifth switch 101 is applied to the second input of the fourth two-input summer 83. The output of the fourth two-input summer 83 is applied through the roll gain circuit 65 to the second input of the fifth two-input summer 85. The roll gain circuit 65 has a gain designated $K_\phi$. The output of the fifth two-input summer 85 is the lateral control surface command signal that controls the ailerons of the aircraft.

The output of the sixth two-input summer 87 is applied through the sync gain circuit 63 to the $\overline{\text{APP O/C}}$ terminal of the fourth switch 99. The sync gain circuit has a gain designated $K_{SYNCH}$. The common terminal of the fourth switch 99 is connected through the second integrator 73 to one input of the second three-input summer 91. The output of the second three-input summer 91 is applied through the second limiter 69 to the second input of the six two-input summer 87 and to the APP O/C terminal of the fifth switch 101. The output of the track angle error filter 59 is also applied through the track angle error gain circuit 61 to the second input of the second three-input summer 91. The track angle error gain circuit 61 has a gain designated $K_{\psi_{TA}}$.

The output of the first two-input summer 77 is applied to the $\overline{\text{APP O/C}}$ terminal of the first switch 93 and to the $\overline{\text{APP O/C}}$ terminal of the second switch 95. The APP O/C terminal of the first switch and the APP O/C terminal of the second switch are unconnected. The common terminal of the first switch 93 is connected through the track angle washout gain circuit 59 to the second input of the first two-input summer 77. The track angle washout gain circuit 59 is an integrator with gain represented by the mathematical equation $K\omega_o/s$ where $K\omega_o$ is the gain and $s$ is the Laplace operator. The common terminal of the second switch 95 is connected through the lateral velocity estimation gain and time constant circuit 55 to the second input of the first three-input summer 89. The lateral velocity estimation gain and time constant circuit performs the function of the time constant circuit 29 (FIG. 3) and has a gain designated $\tau K_{\psi_{TA\,COMP}}$.

The output of the first three-input summer 89 is applied to the common terminal of the third switch 97. The $\overline{\text{APP O/C}}$ terminal of the third switch 97 is applied through the beam filter time constant 51 to one input of the second two-input summer 79. The beam filter time constant circuit is represented by the equation $1/\tau_\eta$ where $\tau_\eta$ is the time constant. The APP O/C terminal of the third switch is applied to the input of the complementary filter time constant circuit 53. The complementary filter time constant circuit is represented by the equation $1/\tau_{\eta_{COMP}}$ where $\tau_{\eta_{COMP}}$ is the time constant. The outputs of the beam filter time constant circuit 51 and the complementary filter time constant circuit 53 are applied to the two inputs of the second two-input summer 79. The output of the second two-input summer 79 is applied through the first integrator 71 to the beam error gain circuit 50 and to the third input of the first three-input summer 89. The beam error gain circuit 50 has a gain dssignated $K_\eta$. The output of the beam error gain circuit is applied to the third input of the second three-input summer 91.

Turning now to a description of the operation of the embodiment of the invention illustrated in FIG. 4, during beam acquisition, all of the switches are in their $\overline{\text{APP O/C}}$ positions. Thus, the only information applied to the fourth two-input summer 83, in addition to $\phi$ is the output from the first limiter 67. The output of the first limiter 67 is a limited summation of the track angle error signal, $\Delta\psi_{TA}$, filtered by the track angle error filter 59 and modified by the track angle error gain 43, and the localizer beam error signal $\eta$ filtered by the beam filter 45. These signals cause the aircraft to capture the ILS localizer beam signal $\eta$ and to maintain close proximity to the beam center. The track angle error filter 59 is included to eliminate quantization resulting from the digital-to-analog conversion of the track angle error signal $\Delta\psi_{TA}$ by the course deviation instrument.

The tract angle error gain circuit (beam acquisition mode) 43 raises the output of the track angle error filter to a suitable level. And, the beam filter (beam acquisition mode) 45 filters the localizer beam error signal, $\eta$, without complementing it. As stated above, both the track angle error filter 59 and the beam filter (beam acquisition mode) 45 are first order lag filters.

The summation output of the third two-input summer 81 is a roll command signal suitable for controlling the ailerons of the aircraft. This signal is limited by the first limiter 67 which prevents excessive aircraft roll. In addition the roll command signal is stabilized by the roll feedback signal $\phi$ and the roll rate signal $\dot\phi$, the latter two signals providing inner loop stabilization.

After the apparatus of the invention has acquired the ILS localizer beam, all of the switches are switched to their APP O/C positions, preferably simultaneously. Prior to switching, however, certain aspects of the invention should be noted. Specifically, the sync gain circuit 63, during acquisition, operates to assure that signal output of the second limiter 69 is essentially the same as the signal output of the first limiter 67 at the moment of switching (the + and − indications of the summers provide a distinction between adding or subtracting the signal in the summation). Thus, a rapid change in the lateral position of the aircraft at the moment of switching is prevented. The sync gain circuit 63 performs this function by applying the difference between the signal outputs of limiters 67 and 69 to the second integrator 73 prior to switching. This action causes the first integrator 73 to augment the output signal of the second limiter 69 until said difference vanishes. As will be better understood from the following description, the output of the beam error integral gain circuit 47 provides lock-on control after switching.

Similarly, the beam filter time constant 51, prior to switching, applies a signal to the first integrator 71 which assures synchronization of the first three-input summer 89 at the time of switching to the APP O/C mode of operation. This signal synchronization is adapted to approximately initialize the rate of change of the output of the first integrator 71 and, hence, prevent unacceptably large lateral changes in the position of the aircraft after switching occurs.

·Further, the track angle washout gain circuit 57 controls the output from the first two-input summer 77 so as to cause the output of the lateral velocity estimation gain and time constant circuit 55 to be approximately zero when switching occurs. Basically, the track angle washout gain circuit 57 applies a feedback input to the first two-input summer 77 that tends to maintain the output of the first two-input summer 77 at zero until switching occurs. The track angle washout gain circuit 57 is required only if there are large bias errors in the lateral velocity signal. If such bias errors are small this circuit may be eliminated.

After the localizer beam has been acquired and the switches have been switched to their APP O/C mode of operation, the system operates in a complementary filter manner to laterally maintain the aircraft "on the localizer beam" without rapid lateral position changes occurring. Specifically, the multiplier 75 linearizes the ILS localizer beam error signal, $\eta$, to compensate for divergence. Thus, the output of the multiplier 75 is proportional to the lateral displacement of the aircraft. Gain is added to this signal by the lateral position estimation gain circuit 66. Thus, the output of the lateral position estimation gain circuit 66 is an approximation of lateral displacement of the aircraft from beam center.

The output of the lateral velocity estimation gain and time constant circuit 55 is related to lateral velocity because the input to that circuit, once the washout circuit is opencircuited, is the track angle error signal, $\Delta\psi_{TA}$. The lateral velocity estimation gain and time constant circuit includes a time constant, as indicated above; thus, this circuit provides the time constant function created by the time constant circuit 29 illustrated in FIG. 3.

Thus, two of the inputs to the first three-input summer 89 are related to lateral displacement and lateral velocity. The complementary filter time constant circuit 53 has a relatively long time constant which implies a relatively low breakpoint in the low-pass filter. For example, $\tau_{\eta\,COMP}$ may be on the order of 20 seconds. Thus, the complementary filter time constant circuit 53 rejects and, hence, eliminates any frequency components above 0.05 radians per second contained in the signal applied to its input. The output of the complementary filter time constant circuit is integraded by the first integrator 71 whereby the complementary filter time constant circuit 53 and the first integrator perform the same function as the first order lag filter 33 illustrated in FIG. 3 and previously described. Hence, the output of the first integrator 71 is an estimated lateral deviation signal. This signal is applied to the beam error gain circuit 50 and is summed with the integrated lock-on signal and the track angle error signal formed at the outputs of the beam error integral gain circuit 47 and the track angle error gain circuit 61, respectively. The result of this summation (the output of the second three-input summer 91) is applied to the input of the second limiter 69. The second limiter limits the aircraft's angle of bank to a predetermined value such as 10°, for example. This limited signal is substituted for the signal previously occurring on output of the first limiter 67 and is used to control the lateral control surfaces (ailerons) of the aircraft after being stabilized by the roll angle signal $\phi$ and the roll rate signal $\dot\phi$.

While a variety of different numerical values can be used in an actual embodiment of the invention, by way of example, the following values were used in one actual embodiment of the invention:

| | |
|---|---|
| $k_{\dot\phi}=1.5$ | $K_{sync}=10$ |
| $k_{\eta_{BA}}=25$ | $k_\phi=4.5$ |
| $k_I=0.0055$ | $k_{\phi_{TA\,COMP}}=76.7$ |
| $k_{\omega_0}=10$ | $\tau_\eta=2.0$ |
| $k_{\psi_{TA}}=3.5$ | $\tau_{\eta_{COMP}}=20$ |
| $k_{\psi_{TA\,BA}}=2.5$ | $\tau_{\phi_{TA}}=0.4$ |
| $\tau_{\eta_{BA}}=2.0$ | $k_\eta=0.11$ |

It will be appreciated from the foregoing description that the invention provides a lateral guidance control system suitable for use in an automatic landing system to control the lateral position of an aircraft with respect to an ILS localizer beam signal, as the aircraft approaches the runway. The invention is designed such that rapid lateral position changes cannot occur. Yet, all of the information necessary to control the ailerons of the aircraft are present in the output command signal. Hence, the invention overcomes the disadvantages of the prior art systems described above, without unduly complicating the control system, or compromising basic stability.

While a preferred embodiment of the invention has been illustrated and described, it will be appreciated by those skilled in the art and others that various changes can be made therein without parting from the spirit and scope of the invention. Hence, the invention can be practiced otherwise than specifically described herein.

The embodiments of the invention in which an exclusive property or privilege is claimed are defined as follows:

1. An improved localizer lateral guidance control system suitable for use in an automatic aircraft landing system comprising:
   A. combining means for receiving a localizer error with distortion signal and an estimated range signal and for combining said localizer error with distortion signal with said estimated range signal to generate a gain programmed beam error signal;
   B. a beam filter connected to said combining means for receiving said gain programed beam error signal and for receiving an estimated signal proportional to lateral velocity, said beam filter combining said gain programed beam error signal with said estimated signal proportional to lateral velocity so as to generate an estimated lateral deviation signal suitable for use by an aircraft to control the lateral control surfaces of the aircraft, said beam filter including:
      1. a complementing gain circuit adapted to receive said estimated signal proportional to lateral velocity;

2. a summer connected to said complementing gain circuit, to receive the output of said complementing gain circuit, and to said combining means to receive said gain programed beam error signal; and, 3. a first order lag filter having a relatively long time constant, said first order lag filter comprising a complementary filter time constant circuit and an integrator, said complementary filter time constant circuit being connected to the output of said summer and the input of said integrator being connected to the output of said complementary filter time constant circuit, the output of said integrator forming said estimated lateral deviation signal; and, C. synchronizing means for synchronizing said beam filter during a beam acquisition mode of operation occurring prior to a guidance control mode of operation, said synchronizing means receiving signals representative of said localizer error with distortion signal, said gain programed beam error signal and said estimated signal proportional to lateral velocity and, in accordance therewith, applying associated synchronizing signals to said beam filter during said beam acquisition mode of operation.

2. An improved localizer lateral guidance control system suitable for use in an automatic aircraft landing system as claimed in claim 1 wherein said synchronizing means includes:

switching means for switching said improved localizer lateral guidance control system from said beam acquisition mode of operation to said guidance control system mode of operation;

a track angle wash-out gain circuit connected, by said switching means, to receive said estimated signal proportional to lateral velocity for synchronizing said beam filter to said estimated signal proportional to lateral velocity prior to said switching means switching said improved localizer lateral guidance control system from said beam acquisition mode of operation to said guidance control system mode of operation;

a sync gain circuit connected, by said switching means, to receive a signal related to said localizer error with distortion signal for synchronizing said beam filter to said localizer error with distortion signal prior to said switching means switching said improved localizer lateral guidance control system from said beam acquisition mode of operation to said guidance control system mode of operation; and, a beam filter time constant circuit connected, by said switching means, to receive said gain programmed beam error signal for synchronizing said beam filter to said gain programmed beam error signal prior to said switching means switching said improved localizer lateral guidance control system from said beam acquisition mode of operation to said guidance control system mode of operation.

* * * * *